US006919898B2

(12) United States Patent
Tucker et al.

(10) Patent No.: US 6,919,898 B2
(45) Date of Patent: Jul. 19, 2005

(54) METHOD AND APPARATUS FOR ASCERTAINING AND SELECTIVELY REQUESTING DISPLAYED DATA IN A COMPUTER GRAPHICS SYSTEM

(75) Inventors: S. Paul Tucker, Ft. Collins, CO (US); Kyle R. Berry, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

(21) Appl. No.: 09/488,752

(22) Filed: Jan. 21, 2000

(65) Prior Publication Data

US 2003/0058221 A1 Mar. 27, 2003

(51) Int. Cl.[7] ................................................ G06T 15/00

(52) U.S. Cl. ...................................................... 345/530

(58) Field of Search ................................ 345/418, 419, 345/420, 423, 619, 620, 530, 536, 543

(56) References Cited

U.S. PATENT DOCUMENTS

| | | | | | |
|---|---|---|---|---|---|
| 5,131,080 | A | | 7/1992 | Fredrickson et al. | 395/164 |
| 5,185,856 | A | | 2/1993 | Alcorn et al. | 395/130 |
| 5,243,447 | A | * | 9/1993 | Bodenkamp et al. | 345/629 |
| 5,335,322 | A | * | 8/1994 | Mattison | 345/542 |
| 5,355,443 | A | * | 10/1994 | Kim et al. | 345/589 |
| 5,371,514 | A | * | 12/1994 | Lawless et al. | 345/629 |

* cited by examiner

*Primary Examiner*—Phu K. Nguyen
(74) *Attorney, Agent, or Firm*—Leslie P. Gehman

(57) ABSTRACT

Regions of frame buffer memory are selectively read by a computer graphics system in a bandwidth efficient manor. Attribute data for each pixel is stored in the frame buffer memory array. This attribute data, when decoded, selects which regions of frame buffer memory are required for display of each pixel. Pixels are grouped as tiles. Before each tile is displayed, attribute data is read for that tile, then decoded, and the frame buffer memory is accessed only for those regions that are needed to display the current tile of pixels.

10 Claims, 7 Drawing Sheets

METHOD AND APPARATUS FOR ASCERTAINING AND SELECTIVELY REQUESTING DISPLAYED DATA IN A COMPUTER GRAPHICS SYSTEM

FIELD OF THE INVENTION

This invention relates generally to the field of computer graphics and more particularly to the field of selection of data from a computer graphics frame buffer for display in an efficient manner.

BACKGROUND OF THE INVENTION

Computer graphics workstations are used for a number of different applications such as computer-aided design (CAD) and computer-aided manufacturing (CAM). These applications often require 3D modeling capability and generally require greater speed in rendering more complicated models as time progresses.

Thus pressure is placed on designers of computer graphics workstations to perform more complicated calculations to provide more accurate rendering of models in shorter amounts of time. Many design techniques, beyond the scope of this description, may be (and are) used by workstation designers to achieve these goals.

One possible embodiment of a computer graphics accelerator is shown in FIG. 2. This system is described in detail below. For now, note that the tile builder, texture mapper, and display unit all communicate with a single frame buffer memory through a memory controller. In this embodiment the frame buffer memory contains the texture data in addition to the data required for display and the data that is being manipulated prior to display (double buffering). Since the frame buffer memory is accessed by different functions, the memory controller must contain arbitration logic to determine which function has access to the frame buffer memory at any given moment. Sometimes two or more functions will require access to the frame buffer memory at the same time and the memory controller must prioritize these requests. Reducing the number of memory requests would reduce the number of such collisions and increase system performance.

In a computer graphics system, the frame buffer memory may be used to store digital data that will be sent to the computer monitor for display. This data may be stored in memory as intensity of red, green and blue colors for each pixel. It may alternately be stored as a gray scale, or other representations of color. Often one or more memory locations are used to store the data representing a single pixel on the computer monitor. Sometimes the entire data bitmap is duplicated so that the processor is allowed to perform calculations on one bitmap while the other is being displayed on the monitor. This is known in the art as double buffering.

Also, there may be additional data stored in the frame buffer to allow the computer to display separate images for each eye to produce stereo images. In this case, there will need to be twice as much area for storage of images in the frame buffer as needed for a monocular display. The frame buffer of a stereo graphics system may contain memory for the left image front and back (for double buffering) and for the right image front and back (also for double buffering).

When the image is to be displayed on the monitor, the display unit must receive pixel data from the correct section of the frame buffer. In the example shown in FIG. 5, for any given pixel on the monitor the display unit will display the data stored in either the left front, left back, right front, right back, or overlay portions of the frame buffer memory. Some computer graphics systems read the pixel data from each of these areas of frame buffer memory and then in the display unit, determine which must be displayed for any given pixel. Generally, a group of pixels, known as a tile, is read from the frame buffer in each read operation. If all of the pixels in the tile require the same region of frame buffer memory to be displayed, for example the left front, all of the other data is discarded by the display unit. This may be a waste of frame buffer bandwidth if the region of frame buffer memory needed for this particular tile may be determined prior to reading from the frame buffer. Thus, there is a need in the art for techniques that reduce the amount of frame buffer memory accesses to perform a given function thereby improving performance of the computer graphics system.

SUMMARY OF THE INVENTION

A representative embodiment of this invention contains a region of frame buffer memory called the attribute region. In this region, an attribute is stored for each pixel of the display that designates which region of frame buffer memory is to be displayed for that pixel. For example, if "0" represents the left front, all of the pixels for which the monitor displays the left front will be represented in attribute memory with a "0". If "1" represents the left back, all of the pixels for which the monitor displays the left back will be represented in attribute memory with a "1". This attribute may contain more than one bit of data in embodiments with more than two regions of frame buffer memory. The attribute memory may physically be part of frame buffer memory, or in some implementations it may be build as a physically separate memory.

When the display unit displays a tile of pixels it first reads the attributes for that tile and determines which regions of frame buffer memory will be needed to display that tile of pixels on the monitor. Next, the display unit requests from the memory controller only those regions of frame buffer memory that are needed, instead of reading from all of the regions of frame buffer memory. This saves bandwidth in reducing the number of reads from frame buffer memory required to display some portions of the data. This saved bandwidth may then be used by the tile builder or texture mapper to increase overall graphics system performance.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
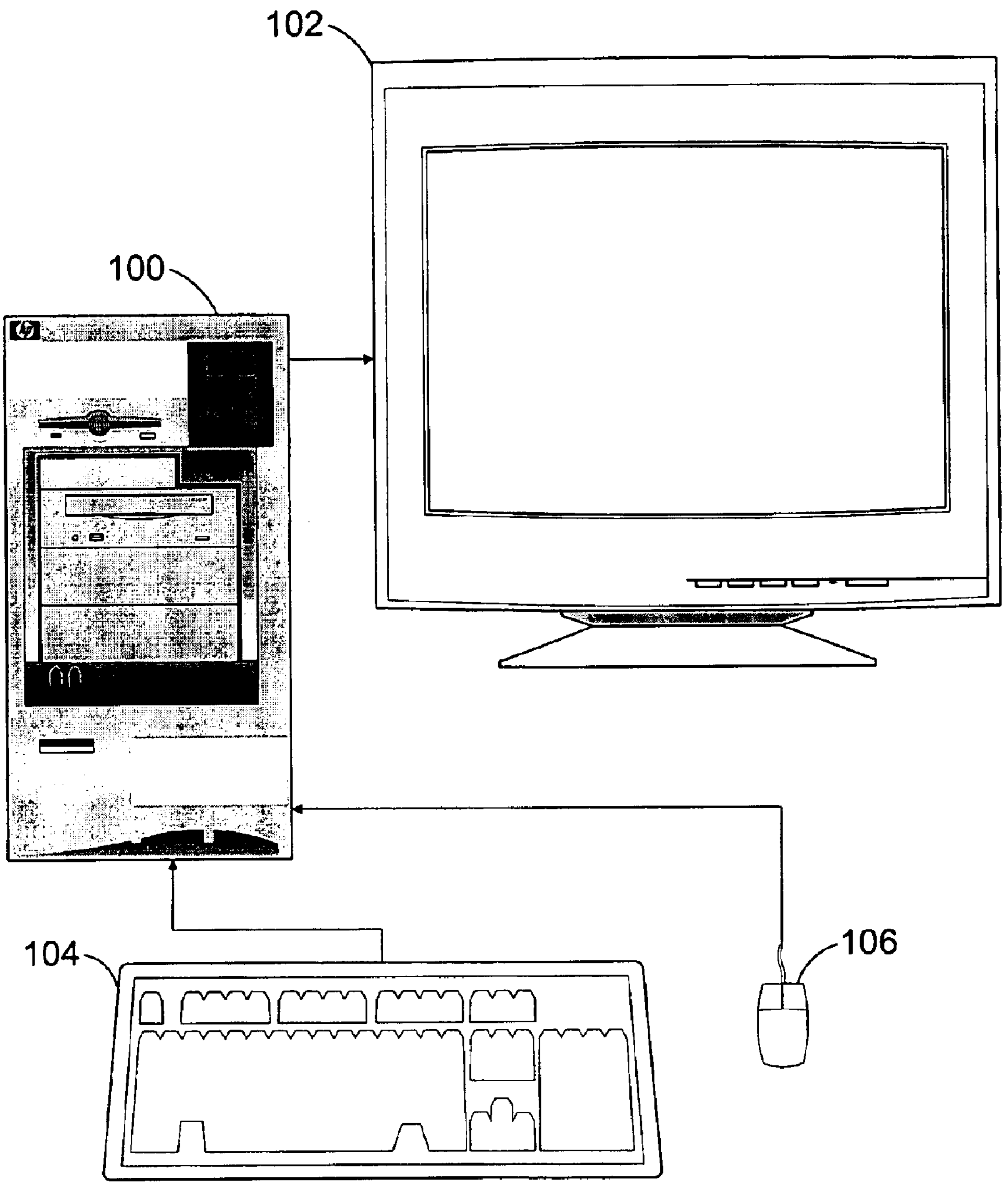
FIG. 1 is a diagram of a computer system.

Most computer systems include hardware dedicated to the display of graphics on a monitor. One illustrative system is shown in FIG. 1. The computer 100 is controlled by the user with a keyboard 104 and a mouse 106. The output of the computer is displayed on the monitor 102.

Figure 2:
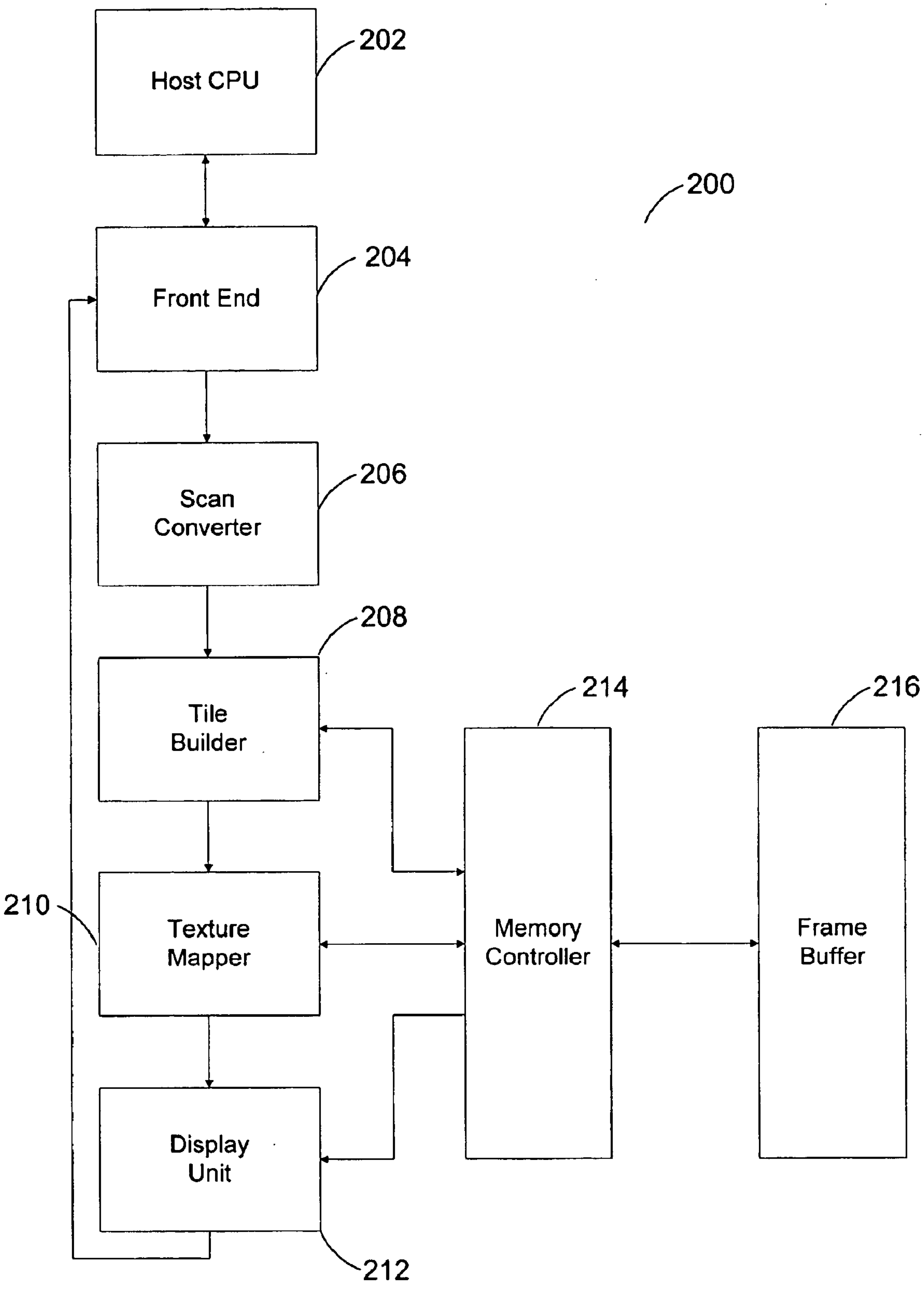
FIG. 2 is a block diagram of a computer graphics system.

The graphics hardware for one such configuration is shown in FIG. 2. The graphics system 200 consists of a number of blocks of circuitry that communicate with each other and the host central processing unit (CPU) 202. The host CPU 202 does the work of generating the graphical image in terms that the graphics system 200 understands. Typically, objects are divided into triangles and the vertices of the triangles are sent to the graphics system 200 for display. The front end 204 of the graphics system 200 controls communication with the host CPU 202. The front end 204 may request information from the host CPU 202 or receive graphics data from the host CPU 202 to then be passed along to the rest of the graphics system 200 hardware. The scan converter 206 receives vertex data and plane equations from the front end and turns them into spans of pixels. Scan conversion (or rasterization) may be accomplished by the use of any of several algorithms known in the art. Since most computer memory is most efficiently accessed in blocks of data, the graphics data must be assembled into appropriate sized tiles. This task is performed by the tile builder 208. The tile builder 208 also sends and receives tiles to and from the frame buffer 216 through the memory controller 214. The frame buffer 216 typically consists of video random access memory (VRAM) and is used to store the pixel data for the image while the graphics system 200 is creating the pixel data before it is displayed on the monitor. See FIG. 5 for an example of one implementation of a frame buffer 216. The texture mapper 210 applies textures to surfaces. These textures are stored in memory in the frame buffer 216 for application to surfaces being displayed. The display unit 212 formats pixel data and sends the data through digital-to-analog converters (DACs) to the monitor. Within the display unit 212, pixel data from the frame buffer 216 is formatted for display on the monitor. Also, the data must transition from the clock domain of the graphics system 200 to that of the monitor for display. This is typically done through asynchronous first-in-first-out memories (FIFOs).

Figure 3:
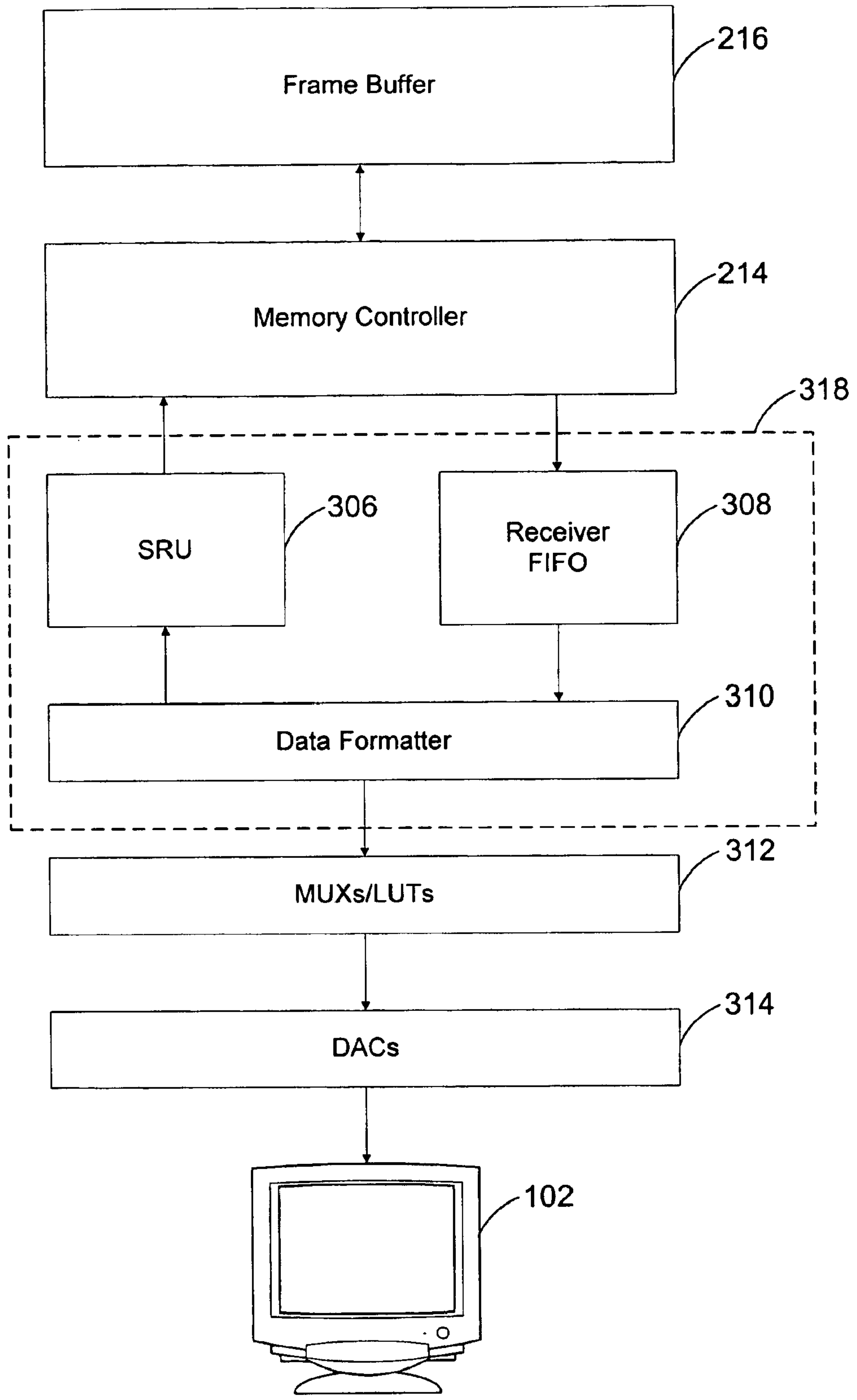
FIG. 3 is a block diagram of a display sub-section of a computer graphics system.

A more detailed block diagram of the back end of the graphics system is shown in FIG. 3. This block diagram shows how the display unit interfaces to the memory controller 214, frame buffer 216, and the monitor 102. The data formatter 310 blends the data in preparation for display on the monitor. At the beginning of each scan line a video timing signal is sent to the screen refresh unit (SRU) 306 causing the SRU to generate the appropriate memory addresses and pass the addresses to the memory controller 214. The memory controller 214 then generates the proper signals to request the correct data from the frame buffer 216. The data from the frame buffer 216 is then sent back through the memory controller 214 to the receiver FIFO 308 within the display unit. The receiver FIFO 308 then passes the data along to the data formatter 310 for conversion to a format suitable for the monitor 102. When data leaves the data formatter 310 it first passes through a block of multiplexors (MUXs) and look-up-tables (LUTs) 312 before it goes to the DACs 314 for conversion to analog signals that are sent directly to the monitor 102. The data formatter, SRU, receiver, and FIFOs 318 are shown in more detail in FIG. 4.

Figure 4:
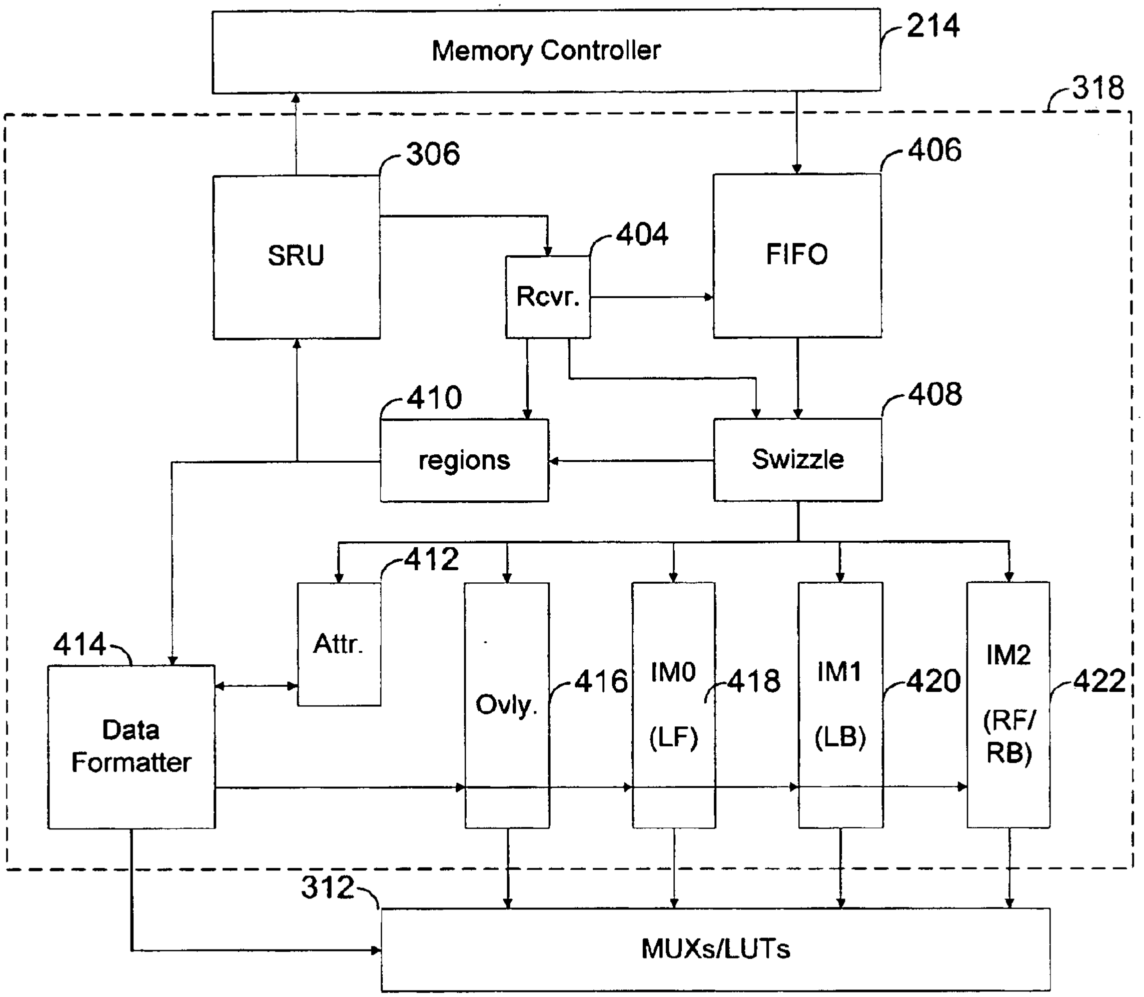
FIG. 4 is a block diagram of a display sub-section of a computer graphics system in more detail than FIG. 3.

FIG. 4 is a block diagram showing a portion of the display unit in more detail. The paths that pixel data follows between the memory controller 214 and the MUXs/LUTs 312 are shown along with the associated FIFOs and logic blocks used. In this figure, the receiver 404 and it's FIFOs 406 have been broken apart and the data formatter 414 has been separated from it's associated FIFOs 412, 416, 418, 420, and 422. As shown in FIG. 3, when the display unit requests more pixel data from the frame buffer, the SRU 306 generates memory address that are sent to the memory controller 214. The memory controller 214 then retrieves pixel data from the frame buffer and passes the data to the receiver FIFO 406. The pixel data is then passed through a swizzle block 408 that collates the attribute, overlay, and image data. The attribute data is sent to the attribute FIFO 412. The attribute data is also sent to the region flags (regions) block 410 where it is used to qualify the memory addresses that the SRU 306 generates. The overlay data goes to the overlay FIFO 416. The image data is sent to one of the three image FIFOs 418, 420, or 422 depending on which image the data corresponds to. When the display is ready receive data, the data formatter 414 formats, blends, and serializes the data from all of the FIFOs 416, 418, 420, and 422 and dumps the data into the MUXs/LUTs block 312. The data formatter 414 also provides control signals to the MUXs/LUTs block 312. Attributes are quantized in 128 bit sets. For memory bandwidth reasons, attributes are read in groups of four. Each group of four contains attribute data for 512 pixels. Thus, in the display unit, pixels are manipulated in blocks of 512. Eight bits of region flag are generated for each image region per set of region flags. The region flags are used to generate memory address data in the memory controller 214. Pixel depth may vary from 8 bits per pixel to 32 bits per pixel in some graphics systems. Thus, for a 32 bits per pixel system, more memory addresses must be generated to retrieve 512 pixels worth of data from the frame buffer than is required for an 8 bits per pixel system. Thus, the number of region flags required for 512 pixels varies. In an 8 bits per pixel system each flag represents 64 pixels and a single flag set of eight covers the required 512 pixels. In a 16 bits per pixel system each flag represents 32 pixels, and two flag sets of eight each are required to cover 512 pixels. In a 32 bits per pixel system each flag represents 16 pixels, and four flag sets of eight each are required to cover 512 pixels.

Figure 5:
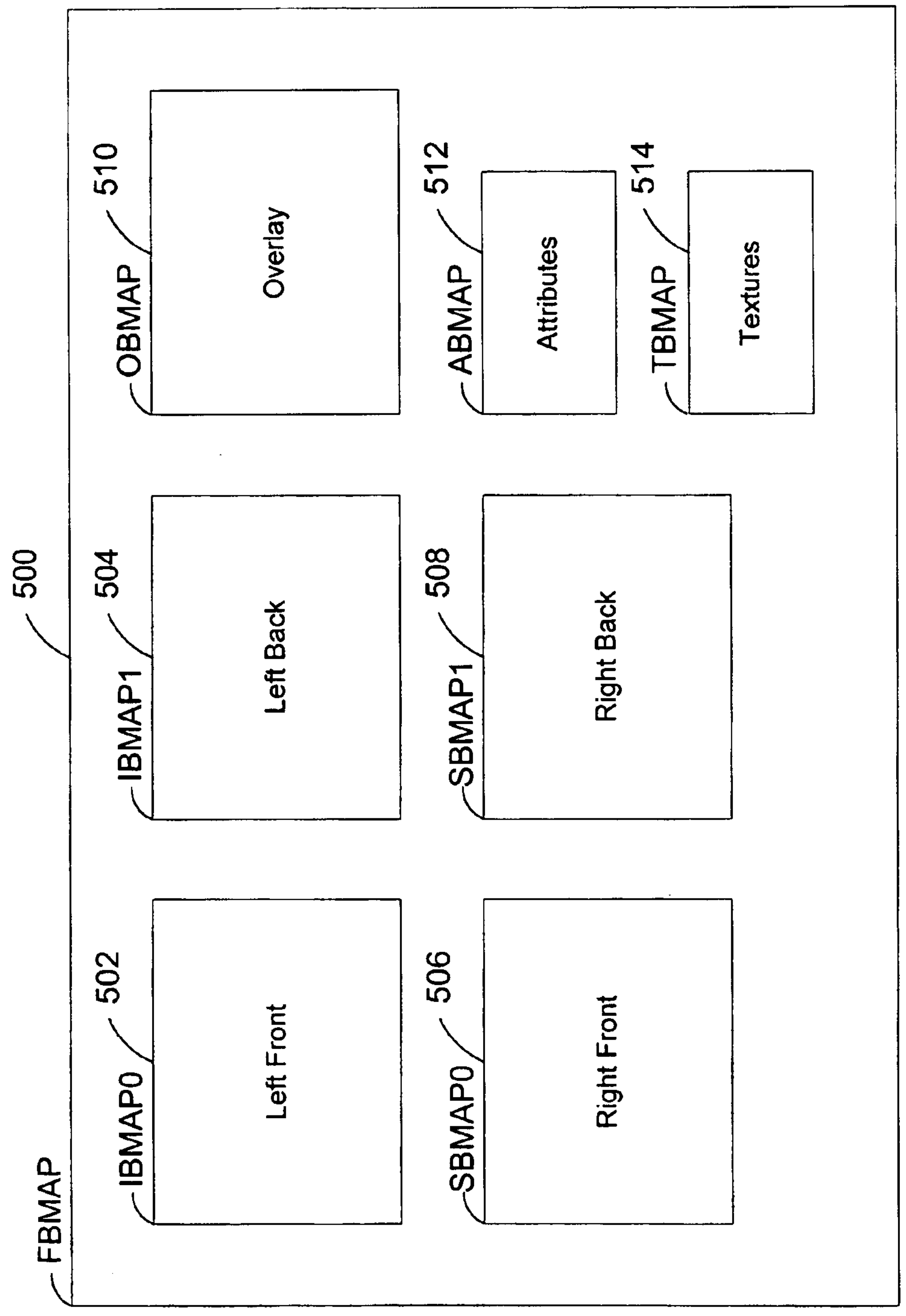
FIG. 5 is a diagram of the address space of one possible frame buffer architecture.

FIG. 5 is a diagram of the address space of one embodiment of a frame buffer. The entire frame buffer memory is represented by rectangle 500. This frame buffer memory has a starting address represented by the label FBMAP. The region of frame buffer memory reserved for the left front image is represented by rectangle 502 with a starting address represented by the label IBMAP0. The region of frame buffer memory reserved for the left back image is represented by rectangle 504 with a starting address represented by the label IBMAP1. The region of frame buffer memory reserved for the right front image is represented by rectangle 506 with a starting address represented by the label SBMAP0. The region of frame buffer memory reserved for the right back image is represented by rectangle 508 with a starting address represented by the label SBMAP1. The region of frame buffer memory reserved for overlay data is represented by rectangle 510 with a starting address represented by the label OBMAP. The region of frame buffer memory reserved for attribute data is represented by rectangle 512 with a starting address represented by the label ABMAP. The region of frame buffer memory reserved for texture data is represented by the rectangle 514 with a starting address represented by the label TBMAP.

Figure 6:
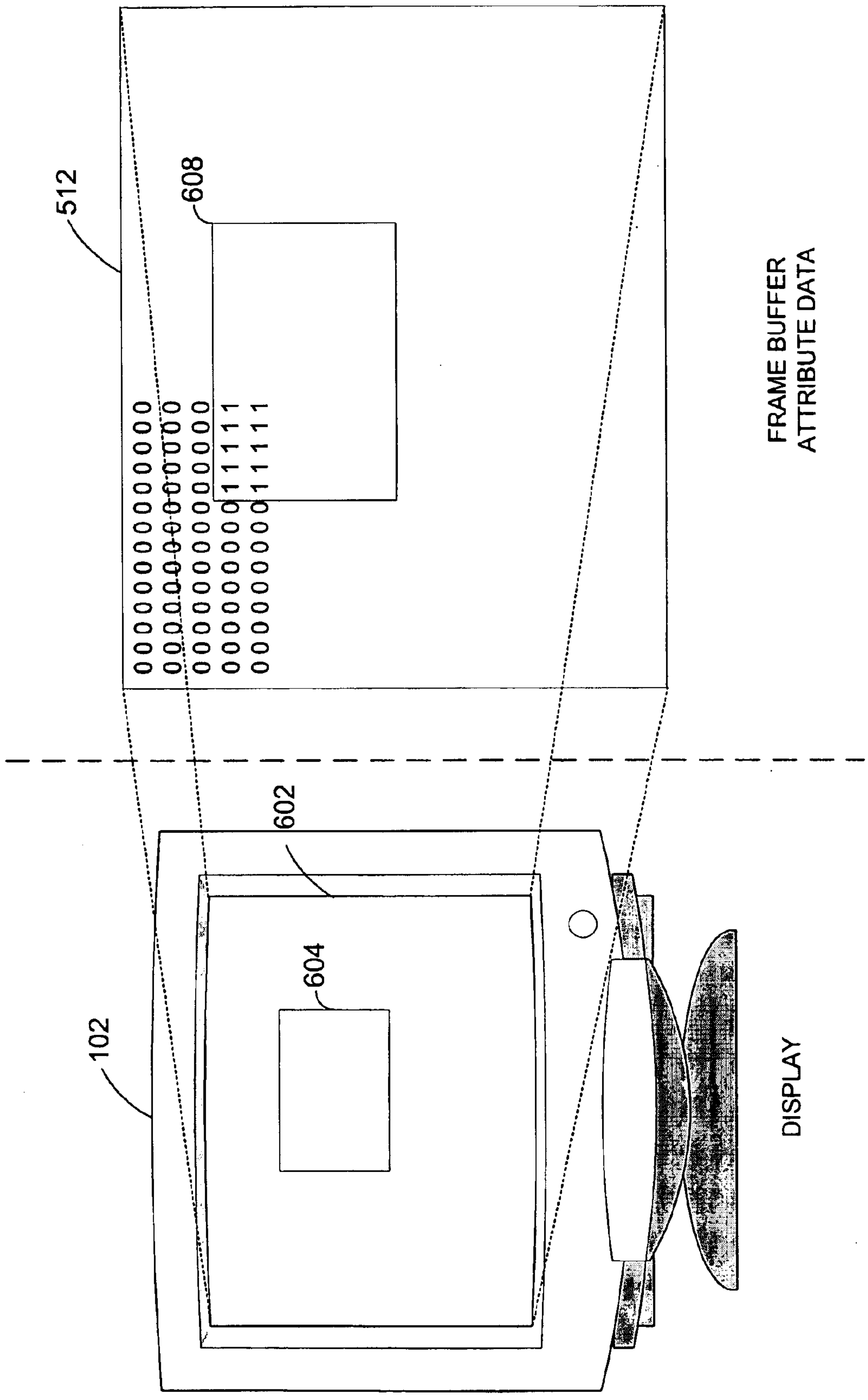
FIG. 6 is a drawing showing the correlation between attribute data stored in the frame buffer and the computer display output.

FIG. 6 illustrates how the frame buffer attribute data correlates to the data displayed on the computer monitor 102. Each monitor pixel, for example, is represented by three bits of data within the attribute memory 512. In this example, the display portion 602 of the monitor may be displaying an image stored in the left front 502 region of frame buffer memory 500 while including a window 604 containing an image stored in the left back 504 region of frame buffer memory 500. In this case the attribute memory 512 would contain 0's in all those locations correlating to pixels within the display area 602 that are outside of the window 604 area. All of the attribute memory 512 representing pixels within the window 604 would contain 1's as shown in rectangle 608 that represents the attribute memory correlating to the window 604. In this example, an attribute of "0" represents the left front region and an attribute of "1" represents the left back region.

Figure 7:
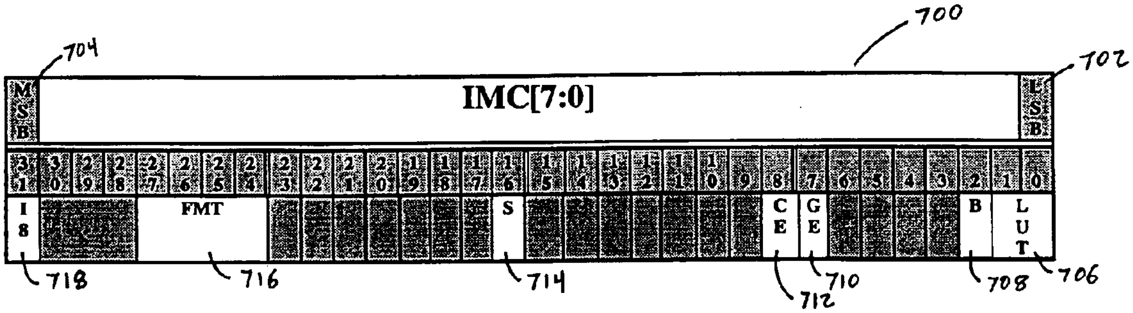
FIG. 7 is a bit definition diagram of the Image Miscellaneous Control Registers and the Image Buffer Select Registers.
Figure 7:
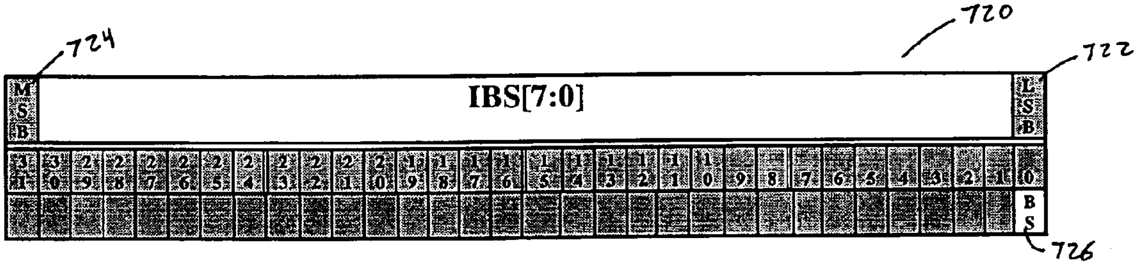

FIG. 7 is a bit definition diagram of the two register arrays that the attribute is used to select from. The three bits of attribute data are decoded to an 8-bit address that is used to select one register from each of the two register arrays. The first register array IMC[7:0] 700 is named the Image Miscellaneous Control Register. It contains control data that is used in the display of the image retrieved from frame buffer memory. IMC[7:0] 700 is an array of 8 32-bit registers. Each register has a least significant bit (LSB) 702 that is labeled bit 0, and a most significant bit (MSB) 704 that is labeled bit 31. I8 718, stored in bit 31, is the 8-bit Index Emulation Bit. When set, it causes pixel Red and Green color values to be replaced with the Blue color value. This replacement occurs just before color-keying and/or alpha-blending and is used to emulate 8-bit gray scale systems. FMT 716, stored in bits 24 through 27, is the pixel format of the region and is defined further in FIG. 8. S 714, stored in bit 16, indicates this visual is stereo in a window. When set, the image displayed in this region is stereo, and the Right Front and Right Back frame buffers are also used. CE 712, stored in bit 8, is the Fast Image Clear Enable Bit. GE 710, stored in bit 7, is the Gamma Enable bit. When set, it causes data to be sent through the gamma correction LUT. B 708, stored in bit 2, is the LUT bypass bit. When set, instead of going through the LUT specified by the LUT field, the system bypasses the color LUT. LUT 706, stored in bits 0 and 1, specifies which of the three available color LUTs are used for this visual.

The second register array shown in FIG. 7 is the Image Buffer Select Register, IBS[7:0] 720. IBS[7:0] 720 is shown as an array of 8 32-bit registers. Each register has a least significant bit (LSB) 722 that is labeled bit 0, and a most significant bit (MSB) 724 that is labeled bit 31. In actual practice, IBS[7:0] 720 may be constructed as an array of 8 1-bit registers, since only one bit of each of these registers is used. These are one bit registers that contain the Buffer Select bit, BS 726, stored in bit 0. When "0", it tells the display unit to display the Primary Buffer pointed to by the IBMAP0 register. When "1", it tells the display unit to display the Secondary Buffer pointed to by the IBMAP1 register.

The outputs of the Image Miscellaneous Control Register and the Image Buffer Select Register are used to generate region flags in the rflags block shown in FIG. 4. These region flags are then used by the screen refresh unit to determine which regions of the frame buffer memory are needed for display.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A display system comprising:

a memory, containing graphics data, divided into multiple logical regions to be selected between for display, and frame buffer attribute data for each pixel of a monitor; and an attribute system, connected to said memory wherein said attribute system automatically selects graphics data from fewer than all of said logical regions based on said frame buffer attribute data and transmits said graphics data to a display, wherein said selected logical regions of memory are not contiguous.

2. The display system recited in claim 1; wherein said graphics data and said frame buffer attribute data are stored in physically separate memories.

3. A display system, comprising:

a memory, containing graphics data, divided into multiple logical regions to be selected between for display, and frame buffer attribute data for each pixel of a monitor; and a regions system, that automatically calculates which regions of said graphics data contain data necessary for display of a block of pixels; wherein said regions are fewer than all of said logical regions, wherein said selected logical regions of memory are not contiguous.

4. The display system recited in claim 3; wherein said graphics data and said frame buffer attribute data are stored in physically separate memories.

5. The display system recited in claim 3;

wherein said regions system sends identities of said regions to a screen refresh unit; and wherein said screen refresh unit, calculates memory addresses from said identities and sends selected graphics data from said memory to a display.

6. The display system recited in claim 5, said logical regions further comprising memory to store graphics data for each pixel of a monitor.

7. A method for selectively reading pixel data from a frame buffer memory array, comprising the steps of:

defining a plurality of regions of frame buffer memory to be selected between for display, wherein each region comprises memory to store graphics data for each pixel of a monitor;

storing frame buffer attribute data for each pixel in a memory, wherein said frame buffer attribute data encodes which of said regions are to be displayed on said monitor;

retrieving said frame buffer attribute data for a pixel from said memory;

calculating a subset of said regions of frame buffer memory that are required to display said pixel on said monitor, wherein said subset of said regions of frame buffer memory are not contiguous; and retrieving from said frame buffer memory pixel data only from said subset of regions of frame buffer memory that are required to display said pixel on said monitor.

8. The method for selectively reading pixel data from a frame buffer memory array as recited in claim 7; wherein said graphics data and said frame buffer attribute data are stored in said frame buffer memory.

9. A method for selectively reading pixel data from a frame buffer memory array, comprising the steps of:

defining a plurality of regions of frame buffer memory to be selected between for display, each region further comprising memory to store graphics data for each pixel of a monitor;

storing frame buffer attribute data for each pixel in a memory, encoding which of said regions are to be displayed on said monitor using the frame buffer attribute data;

defining groups of pixels as tiles;

selecting a tile for display on said monitor;

retrieving said frame buffer attribute data for said tile from said memory;

calculating a subset of said regions of frame buffer memory that are required to display said tile on said monitor, wherein said subset of said regions of frame buffer memory are not contiguous; and retrieving from said frame buffer memory pixel data only from said subset of regions of frame buffer memory that are required to display said tile on said monitor.

10. The method for selectively reading pixel data from a frame buffer memory array as recited in claim 9; wherein said graphics data and said frame buffer attribute data are stored in said frame buffer memory.

* * * * *